Nov. 5, 1968     W. KISSELMANN ET AL     3,408,909

FILM CARTRIDGE FOR PHOTOGRAPHIC CAMERA

Filed Sept. 30, 1965

INVENTOR.
WILLY KISSELMANN
JOSEF HOFMANN
RUDOLF MATTHESS
EUGEN SCHMIDT

United States Patent Office 3,408,909
Patented Nov. 5, 1968

3,408,909
FILM CARTRIDGE FOR PHOTOGRAPHIC CAMERA
Willy Kisselmann, Grunwald, near Munich, Josef Hofmann, Unterhaching, near Munich, and Rudolf Matthess and Eugen Schmidt, Munich, Germany, assignors to Agfa-Gevaert Aktiengesellschaft, Leverkusen, Germany
Filed Sept. 30, 1965, Ser. No. 491,627
Claims priority, application Germany, Oct. 1, 1964,
A 47,222
4 Claims. (Cl. 95—31)

ABSTRACT OF THE DISCLOSURE

A film cartridge wherein the light trap comprises a U-shaped carrier for plush bands. The carrier is inserted into the mouth of the cartridge and supports a film coiling loop of elastic material.

---

The present invention relates to photographic cameras in general, and more particularly to improvements in film cartridges or cassettes which may be used in such cameras to collect or to pay out a length of roll film. Still more particularly, the invention relates to improvements in the construction and mounting of light traps which are used to prevent penetration of light through the mouth of a film cartridge.

Film cartridges are normally provided with light traps in the form of bands consisting of plush, velvet or the like. The insertion and attachment of such bands in the mouth of a film cartridge presents considerable problems, particularly if the housing of the cartridge consists of synthetic plastic material which is not bent into its final shape but is molded or otherwise shaped so as to immediately assume its final form. Additional problems arise when the sealing material must be applied in plastic cartridges of the type wherein the film is coiled up without being connected to a rotary spool. As a rule, such cartridges comprise so-called coiling or convoluting devices which are provided in the chamber defined by the housing of the cartridge and serve to automatically convolute the film at the same rate at which the film is being fed through the mouth. The mouth of the cartridge is rather narrow for obvious reasons and, therefore, the insertion of plush bands or the like, as well as the insertion and attachment of the film coiling means invariably involves much work, complicated machinery and skilled labor with resultant increase in the cost of the ultimate product.

Accordingly, it is an important object of the present invention to provide a very simple, reliable and inexpensive light trap which may be readily inserted in a film cartridge for photographic cameras and to construct the film trap in such a way that it may be used with equal advantage in cartridges which consist of non-deformable rigid synthetic plastic material as well as in cartridges which are obtained by deformation of metallic sheet material and wherein the light trap can be installed prior to imparting to the housing of the cartridge its ultimate shape.

Another object of the invention is to provide a light trap which can be removed from a film cartridge as a unit and can be reinserted into the same cartridge or into another cartridge.

An additional object of our present invention is to provide a film cartridge which embodies a film trap of the above outlined characteristics and wherein the film trap may also serve as a holder or support for a film coiling device so that the coiling device and the film trap may be installed as a unit.

A further object of the instant invention is to provide a film cartridge of the just outlined characteristics whereinin the light trap is constructed and assembled in such a way that the provision of the film coiling means does not interfere with the sealing action when the film trap is properly mounted in the mouth.

A concomitant object of the invention is to provide a very simple light trap which is particularly suited for use in film cartridges whose housing consists of rigid synthetic plastic material and wherein the light trap cannot be inserted and located prior to imparting to the housing its final shape.

Still another object of the invenion is to provide a film cartridge with a housing of the type having a removable cover or lid at one end of the mouth and to provide such housing with novel retaining or clamping means for holding the light trap in requisite position against undesirable displacements in response to introduction or withdrawal of the film through the mouth.

Briefly stated, one feature of our invention resides in the provision of a film cartridge for photographic cameras which comprises a housing having an elongated mouth extending between its end walls and in the longitudinal direction of the mantle, and a light trap which includes carrier means preferably consisting of flexible elastic metallic strip stock and removably or permanently inserted in the film mouth so that its end portions are engaged by retaining means provided on the housing, and sealing means attached to the carrier means and filling the remainder of the mouth to prevent penetration of light into the internal chamber of the housing.

The carrier means may resemble a U-shaped body whose sections or legs are spaced from each other and extend along the opposite sides of the mouth. The sealing means preferably comprises bands of plush or like material which are bonded to the inner surfaces of and are located between such sections or legs. The retaining means may comprise clamping projections or lugs which grip the end portions of the carrier sections and which may hold the carrier means solely by friction, by snap action, due to engagement of complementary male and female parts, by suspending the carrier means thereon or in another suitable way.

The novel features which are considered as characteristic of the invention are set forth in particular in the appended claims. The improved film cartridge itself, however, both as to its construction and the mode of assembling the same, together with additional features and advantages thereof, will be best understood upon perusal of the following detailed description of certain specific embodiments with reference to the accompanying drawings, in which:

Figure 1:
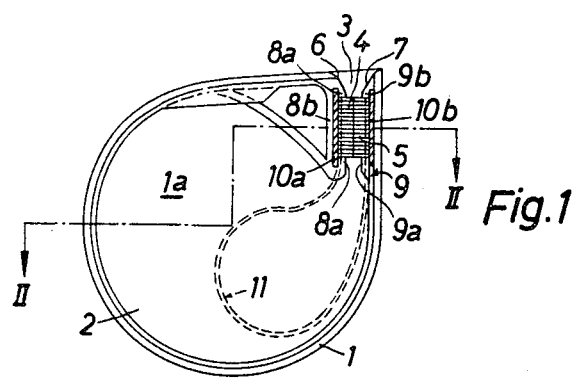
FIG. 1 is a somewhat schematic end elevational view of a film cartridge which embodies one form of our invention, one end wall of the cartridge housing having been omitted for the sake of clarity.
Figure 2:
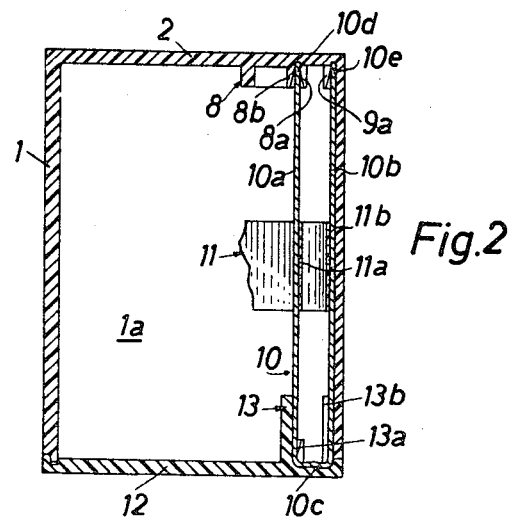
FIG. 2 is a section substantially as seen in the direction of arrows from the line II—II of FIG. 1, with the sealing means omitted.

Referring first to FIGS. 1 and 2, there is shown a film cartridge for use in still cameras and comprising a housing composed of a substantially tubular mantle 1, a first end wall 2 which is integral with one end of the mantle 1, and a second end wall 12 which constitutes a cover or lid and is detachably secured to the unit including the parts 1 and 2. The housing preferably consists of rigid synthetic plastic material and defines an internal chamber 1a which may accommodate a supply of convoluted film, such film being introduced or withdrawn through an elongated narrow mouth 3 which extends between the end walls 2, 12 and is parallel with the longitudinal direction of the mantle 1. The plastic parts of the housing are usually produced by an injection molding process. Therefore, the insertion of a conventional light trap into the mouth 3 of a plastic cartridge presents serious problems because the sealing material must be glued to the surfaces which bound the sides of the mouth. The mouth 3 extends between two lips 6, 7 and, in accordance with conventional practice, the sealing bands 4, 5 which consist of plush or the like are bonded directly to the respective lips.

In accordance with our present invention, the housing of the film cartridge is provided with a pair of retaining means which are disposed at the opposite ends of the mouth 3 and may engage and hold a detachable light trap of novel construction. The retaining means at the upper end of the mouth 3, as viewed in FIG. 2, comprises two sockets 8 and 9 which are respectively provided with clamping projections or lugs 8a, 8b and 9a, 9b. The other retaining means is provided on the end wall 12 and on the mantle 1 and comprises a socket 13 having clamping projections or lugs 13a, 13b.

The light trap comprises the aforementioned bands 4, 5 and a U-shaped carrier 10, the latter having two elongated parallel sections or legs 10a, 10b and a web 10c which connects the sections 10a, 10b to each other. The web 10c may be held by the socket 13 and the free end portions or tips 10d, 10e of the carrier sections 10a, 10b may be held by the sockets 8 and 9. The inner surfaces of the sections 10a, 10b face each other and are attached to the bands 4, 5 by means of a suitable adhesive. Thus, instead of bonding the bands 4, 5 directly to the lips 6, 7, we provide the light trap with a carrier 10 which is connected with the bands 4, 5 and which may be inserted into or removed from the mouth 3. The two retaining means insure that the carrier 10 is held with a requisite force so that it can withstand friction between the film (not shown) and the bands 4, 5 when the film is being introduced into or withdrawn from the chamber 1a.

The carrier 10 preferably consists of a strip of flexible metallic material, for example, elastic steel strip stock, which is stamped from a large flat sheet and is oxidized and bent into the form of a U-shaped body. The strip which is stamped from the metallic sheet must have a length which at least approximates twice the axial length of the mantle 1 so that, upon deformation of the strip, the sections 10a, 10b will be long enough to extend along the full length of the mouth 3. It is often preferred to partially bend the strip prior to connection of the bands 4 and 5.

FIGS. 1 and 2 show further that the carrier 10 may also support a deformable film coiling or convoluting device 11 which is accommodated in the chamber 1a and resembles a loop whose end portions 11a, 11b are bonded or otherwise attached to median portions of the sections 10a, 10b so as to be overlapped by the bands 4 and 5, respectively. The coiling device 11 may consist of elastically deformable material, such as sheet rubber or the like, and causes the leading end of the film to coil itself up in a fully automatic way when the film is being fed through the mouth 3, i.e., between the bands 4, 5.

Figure 3:
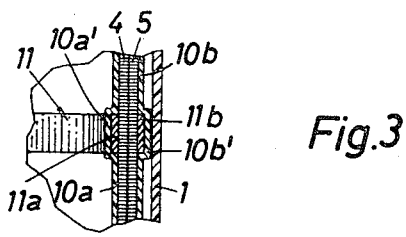
FIG. 3 is a fragmentary section through a modified film cartridge.

In the modified cartridge of FIG. 3, the inner surfaces of the sections 10a, 10b are provided with shallow recesses or depressions 10a', 10b' for the end portions 11a, 11b of the coiling device 11. Such depressions insure that the bands 4 and 5 will not bulge in front of the end portions 11a, 11b and that the mouth will positively prevent the penetration of any light into the chamber 1a. Otherwise, the construction of the film cartridge shown in FIG. 3 can be the same as that of the cartridge shown in FIGS. 1 and 2.

In accordance with a first method, the light trap including the carrier 10 and the bands 4, 5 may be inserted as follows: The carrier 10 is bent into the form of the U-shaped body shown in FIG. 2 and its web 10c is inserted into the socket 13 so that portions of the sections 10a, 10b and the web 10c are engaged by the projections 13a, 13b. The end wall 12 is thereupon attached to the open end of the mantle 1 whereby the free end portions 10d, 10e of the legs or sections 10a, 10b travel in the mouth 3 and penetrate between the projections 8a, 8b and 9a, 9b of the sockets 8 and 9.

Alternatively, the free end portions 10d, 10e may be inserted into the sockets 8, 9 in a first step, and the web 10c is automatically received in the socket 13 in response to attachment of the end wall 12. In such instance, the projections 13a, 13b of the socket 13 may be dispensed with.

Still further, the free end portions 10d, 10e may be inserted into the sockets 8, 9 in such a way that the web 10c extends to a level above the mouth 3, as viewed in FIG. 1. In the next step, the operator attaches the end wall 12 to the mantle 1 and, in the final step, presses the web 10c into the mouth 3 so that the web 10c and the adjoining end portions of the sections 10a, 10b will penetrate into the socket 13. If the film trap is inserted in accordance with this last described method, the width of the carrier 10 preferably exceeds the width of the bands 4 and 5 so that portions of the carrier remain uncoated with plush and such uncoated portions are received in the sockets 8, 9 and 13.

It will be readily apparent that our improved film cartridge is susceptible of many modifications without departing from the spirit of our invention. For example, the U-shaped carrier 10 may be replaced by two carrier sections or legs 10a, 10b which need not be connected to each other. The carrier 10 or the individual sections 10a, 10b may consist of plastic or other non-metallic material, and the coiling device 11 may be constructed and configurated in a manner other than that shown in the drawings. If the carrier 10 is replaced by two separate sections 10a, 10b, the retaining means including the socket 13 is preferably replaced by a retaining means which is a mirror image of the retaining means including the sockets 8 and 9. It is further clear that the web 10c of the carrier 10 may be mounted on the end wall 2 and that the end portions 10d, 10e of the sections 10a, 10b may be made to extend into retaining means provided on the end wall 12. This would amount to a simple reversal of positions of the two retaining means shown in FIG. 2. Still further, all of the retaining means may be provided on the mantle 1 or, at least, the entire retaining means including the socket 13 may be made integral with the mantle 1. Also, the lips 6 and 7 may comprise guide portions which receives parts of the sections 10a, 10b to insure that the sections are properly aligned with each other. Finally, the carrier may resemble a T-shaped or H-shaped or otherwise configurated body, depending on the configuration of the projections which form part of the sockets 8, 9 and 13 or analogous retaining means.

The legs or sections 10a, 10b may support two or more film looping devices 11. Alternatively, the looping device 11 can be of the type which is properly supported if only one of its end portions is secured to the carrier 10.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. A film cartridge for photographic cameras, comprising a housing defining an internal chamber and having an elongated mouth through which the film may be introduced into and withdrawn from said chamber; a light trap comprising a pair of elongated carrier sections inserted into said mouth, and sealing means attached to and extending between said carrier sections;

and film coiling means comprising at least one deformable film coiling member provided in said chamber, said member having a pair of end portions each of which are attached to one of said carrier sections.

2. A film cartridge for photographic cameras, comprising a housing defining an internal chamber and having an elongated mouth through which the film may be introduced into and withdrawn from said chamber; a light trap comprising a pair of elongated carrier sections inserted into said mouth, and sealing means attached to and extending between said carrier sections; and deformable film coiling means provided in said chamber, said coiling means comprising a loop consisting of elastic material and having a pair of end portions each bonded to one of said carrier sections.

3. A film cartridge for photographic cameras, comprising a housing defining an internal chamber and having an elongated mouth through which the film may be introduced into and withdrawn from said chamber; a light trap comprising a pair of elongated carrier sections inserted into said mouth, and sealing means attached to and extending between said carrier sections; and deformable coiling means provided in said chamber and having a pair of end portions each attached to one of said carrier sections, said carrier sections having internal surfaces facing each other and provided with depressions accommodating the respective end portions of said coiling means.

4. A film cartridge for photographic cameras, comprising a housing having an elongated mouth; a light trap including carrier means inserted into said mouth and sealing means attached to said carrier means; and film looping means comprising at least one member provided in said housing supported solely by said carrier means, said member having a pair of end portions each of which are attached to said carrier means.

References Cited

UNITED STATES PATENTS

| | | | |
|---|---|---|---|
| 1,694,401 | 12/1928 | Slocum | 242—71.1 |
| 1,954,328 | 4/1934 | Sauer | 352—75 |
| 2,008,994 | 7/1935 | Sauer | 352—75 |
| 2,484,248 | 10/1949 | Roehrl | 242—71.1 |

FOREIGN PATENTS

| | | |
|---|---|---|
| 780,118 | 1/1935 | France. |
| 1,897,740 | 7/1964 | Germany. |

OTHER REFERENCES

Gutjahr et al.: German Application 1,007,615, printed May 2, 1957 (KL57a 22/03).

NORTON ANSHER, *Primary Examiner.*

JOSEPH F. PETERS, JR., *Assistant Examiner.*